United States Patent [19]

Hunter

[11] Patent Number: 5,390,178

[45] Date of Patent: Feb. 14, 1995

[54] COMMUNICATIONS SWITCHING NETWORK

[75] Inventor: David K. Hunter, Glasgow, United Kingdom

[73] Assignee: The University of Strathclyde, Glasgow, Scotland

[21] Appl. No.: 117,020

[22] PCT Filed: Mar. 6, 1992

[86] PCT No.: PCT/GB92/00400

§ 371 Date: Sep. 7, 1993

§ 102(e) Date: Sep. 7, 1993

[87] PCT Pub. No.: WO92/16079

PCT Pub. Date: Sep. 17, 1992

[30] Foreign Application Priority Data

Mar. 7, 1991 [GB] United Kingdom ............... 9104861

[51] Int. Cl.[6] ................... H04J 14/08; H04Q 11/04
[52] U.S. Cl. ..................... 370/63; 370/65.5; 370/68; 340/826; 340/825.8; 359/117; 359/140

[58] Field of Search ............ 370/58.1, 58.2, 58.3, 370/54, 59, 63, 65, 65.5, 66, 68; 340/825.03, 826, 825.79, 825.8; 379/271, 272, 291, 335; 359/115, 117, 138, 139, 140

[56] References Cited

U.S. PATENT DOCUMENTS

| | | | |
|---|---|---|---|
| 3,965,301 | 6/1976 | Kevorkian | 370/65 |
| 4,074,077 | 2/1978 | Charransol et al. | 370/63 |
| 4,400,627 | 8/1983 | Zola | 370/54 |
| 4,412,322 | 10/1983 | Briley et al. | 370/63 |
| 4,701,907 | 10/1987 | Collins | 370/63 |
| 5,136,579 | 8/1992 | Nguyen | 370/59 |

*Primary Examiner*—Alpus H. Hsu
*Attorney, Agent, or Firm*—Nixon & Vanderhye

[57] ABSTRACT

A communications switching network utilizes time-space-time switching nets and 2×2 switches and reconfigurable space switch nets in numerous configurations which place no limitation on the number of signals that can be handled in parallel with constant signal attenuation irrespective of the route through the network. The number of switches is comparatively modest and frame integrity is provided in certain configurations. The networks may be adapted to handle optical signals.

8 Claims, 4 Drawing Sheets

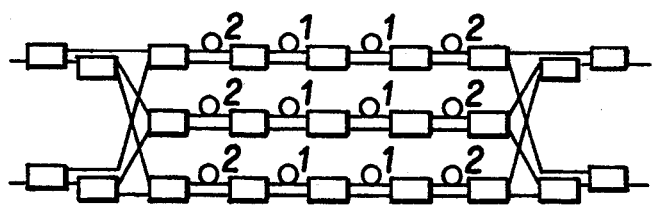
FIG. 12  T(2.4) WITHOUT FRAME INTEGRITY
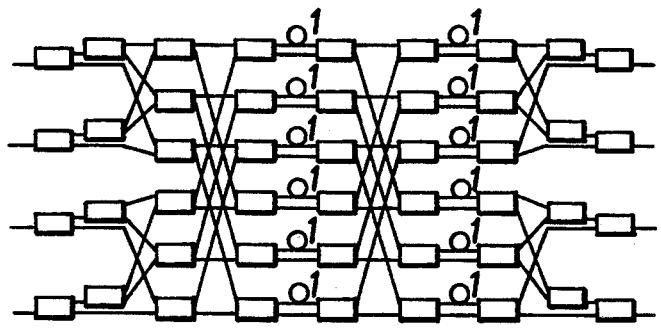
FIG. 13  T(4.2) WITHOUT FRAME INTEGRITY
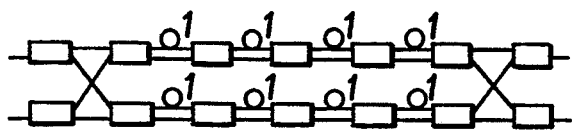
FIG. 14  T(2.2) WITH FRAME INTEGRITY
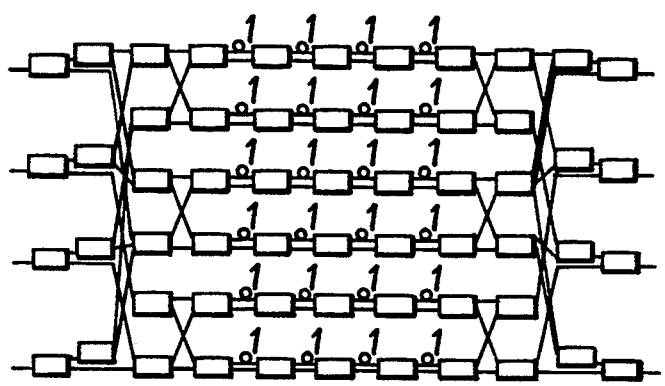
FIG. 15  T(4.2) WITH FRAME INTEGRITY

COMMUNICATIONS SWITCHING NETWORK

BACKGROUND OF THE INVENTION

This invention relates to communications switching networks, particularly but not exclusively to networks adapted to handle optical communications signals such as may arise, for example, in optical computing.

RELATED ART

Communications switching networks are already known for time division multiplexing the blocks of a multi-block communications signal and also for space-domain switching, but the known networks are limited in the number of signals that can be handled in parallel and/or require large numbers of switches and/or attenuate the respective signals variably by an amount dependent upon the particular route through the network. When the network is adapted to handle optical signals, for example using lithium niobate switches, the switches are individually very expensive so that large numbers of switches are disadvantageous.

SUMMARY OF THE INVENTION

It is an object of the present invention to provide a new and improved form of communications switching network.

According to one aspect of the present invention there is provided a communications switching network comprising: M number of input terminals for receiving M number of multi-block communications signals in parallel, M number of output terminals for delivering M number of signals in parallel, first and second time-space-time (TST) switching nets each having M/2 input terminals and M/2 output terminals.

- a first set of M/2 number of 2×2 cross-bar switches connected between the input terminals of the TST switching nets and the M input terminals with each switch in said first set having a first output connected to the first TST switching net and a second output connected to the second TST switching net,
- a second set of M/2 number of 2×2 crossbar switches connected between the output terminals of the TST switching nets and the M output terminals with each switch in said second set having a first input connected to the first TST switching net and a second input connected to the second TST switching net.

Each TST switching net may comprise first and second sets of M/2 time-slot-interchangers (TSI) interconnected by a reconfigurable space switch net having M/2 inputs and M/2 outputs. Alternatively each TST switching net may comprise the functional equivalent of the aforesaid space switch net with first and second sets of time slot interchangers, the equivalent comprising a distributed collection of interconnected switches and delay lines.

In one arrangement each TSI or its functional equivalent is an N timeslot interchanger, where N is the number of timeslots per frame in each of the signals delivered to the M input terminals of the communications switching network.

In another arrangement, each TSI or its functional equivalent is an N/2 timeslot interchanger. For example each TST switching net may further comprise a third set of M/2 number of 2×2 crossbar switches connected between the first set of timeslot interchangers and the first set of switches with each switch in said third set having one of its outputs directly connected to a TSI and the other of its outputs connected to a TSI via a delay line, and a fourth set of M/2 number of 2×2 crossbar switches connected between the second set of timeslot interchangers and the second set of switches with each switch in said fourth set having one of its inputs directly connected to a TSI and the other of its inputs indirectly connected to a TSI via a delay line.

To preserve frame integrity of the multiblock communications switching signals at the M output terminals of the communications switching network, each TST switching net or its functional equivalent further comprises a fifth set of M/2 number of 2×2 cross-bar switches connected between the first set of timeslot interchangers and the third set of switches with each switch in said fifth set having one of its outputs directly connected to a TSI and the other of its outputs connected to a TSI via a delay line, and a sixth set of M/2 number of 2×2 cross-bar switches connected between the second set of timeslot interchangers and the fourth set of switches with each switch in said sixth set having one of its inputs directly connected to a TSI and the other of its inputs indirectly connected to a TSI via a delay line.

The communications switching networks in accordance with the present invention are not limited in the number of signals that can be handled in parallel so that M can be any suitable number and the attenuation of each signal is constant and is independent of its route through the network. Additionally the number of switches required by the networks is comparatively modest. For example, because each network has first and second reconfigurable space switch nets each with M/2 inputs the number of switches used by these nets is $2(M/2)^2$ which is substantially less than if only a single reconfigurable space switch net were used for all of the M input terminals since such a net would require $M^2$ switches. Furthermore when each TSI is an N/2 timeslot interchanger a further saving in switches arises because each N timeslot TSI uses, typically, 2N-2 switches whereas two N/2 TSI would use 2 (2N/2-2) switches. Additionally, when the network is configured to preserve frame integrity, one further switch can be eliminated from either of the second and fourth sets of switches by substituting fixed links for that omitted switch.

When the network is adapted to handle optical communications signals the 2×2 cross-bar switches may be implemented as optical directional coupler switches.

It will be understood that in the communications switching networks according to the present invention the conditions of the various switches are determined by a central controller which sets the switch condition at the end of each timeslot. Thus the conditions of the switches in the first, second, third and fourth sets together with the conditions of each TST switching net or its functional equivalent are set to effect a particular assignment for example in the manner described by Opferman and Tsao-Wu in Bell System Technical Journal Vol. 50 No. 5 (May-June 1971) at pages 1579–1600. When the network is configured to preserve frame integrity the switches of the fifth set are simultaneously all in the same state, the switches of the sixth set are simultaneously all in the same state (which may be the same as that of the fifth set or may be different), all switches are switched at the end of every timeslot and are controlled to be in their crossed state on the arrival of a first data block of a frame.

It will be understood that in its broadest aspect the present invention provides each and every individual communications switching network and all possible combinations thereof as is hereafter described.

BRIEF DESCRIPTION OF THE DRAWINGS

Embodiments of the present invention will now be described by way of example with reference to the accompanying drawings, of which:

FIGS. 12–15 illustrate other particular examples of finished networks.

Detailed Description of Exemplary Embodiments

Figure 1:
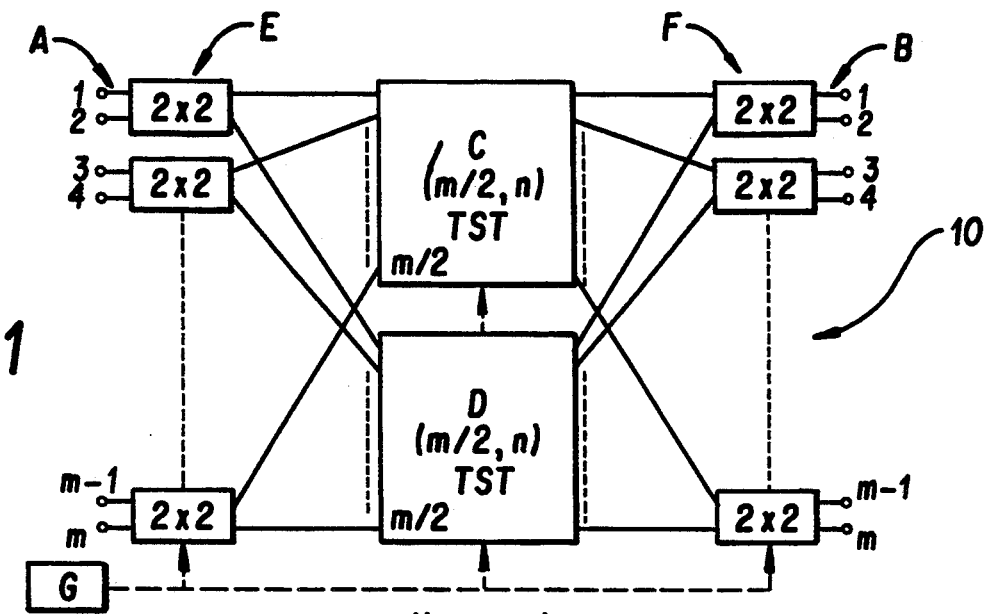
FIG. 1 illustrates an exemplary embodiment of a communication switching network in accordance with this invention.

FIG. 1 illustrates a communications switching network 10 comprising a set A of input terminals which are M in number and a set B of output terminals which are also M in number, a first time-space-time switching net C having M/2 input terminals and M/2 output terminals, a second time-space-time switching net D having M/2 input terminals and M/2 output terminals, a first set E of M/2 number of 2×2 cross-bar switches and a second set F of M/2 number of 2×2 cross-bar switches. Each switch of set E has one output connected to an input of net C and its other output connected to an input of net D. Each switch of set F has one input connected to the output of net C and its other input connected to an output of net D. A controller G is schematically connected to components C,D,E and F to establish the desired conditions for any particular assignment.

Figure 2:
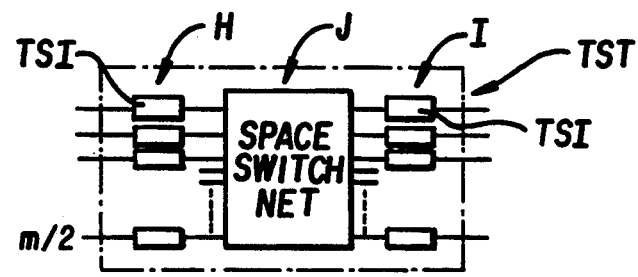
FIG. 2 illustrates the configuration for a simple exemplary form of net C (and net D) in FIG. 1.

In its simplest form net C (and net D) is configured as shown in FIG. 2 comprising a set H of M/2 number of timeslot interchangers (TSI) and a set I of M/2 number of timeslot interchangers interconnected by a reconfigurable space switch net J having M/2 inputs and M/2 outputs. Each TSI, as is well known, has only one input and one output and comprises a plurality of delay lines to enable the interchanging of the timeslot accorded to a data block by suitably delaying the respective data blocks in a frame. The space switch net J, as is also known, comprises a plurality of switches which are reconfigurably interconnected but without provision of delay lines or other storage mechanism.

Figure 3:
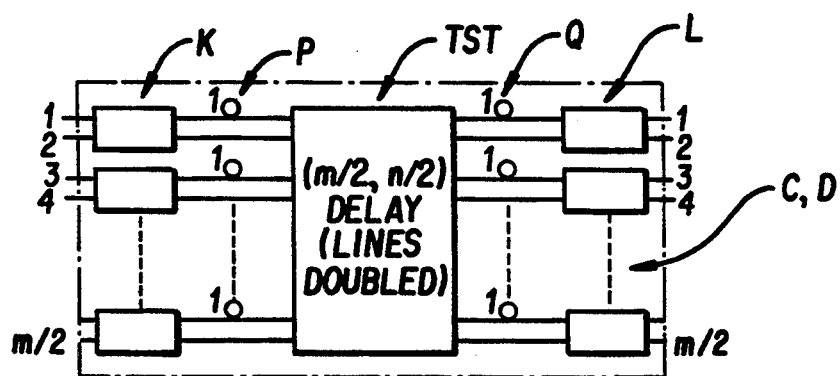
FIG. 3 illustrates a modified exemplary arrangement for net C (and net D) in FIG. 1.

In a modified arrangement net C (and net D) may be configured as shown in FIG. 3 which incorporates the TST of FIG. 2, in which case the delay lines of each TSI are doubled in length so that each TSI functions as an N/2 timeslot interchanger in the sets H and I, and additionally a third set K of switches is provided together with a fourth set L of switches. The switches of sets K and L are each 2×2 cross-bar switches and in set K each switch has one output directly connected to a TSI of set H whereas its other output is indirectly connected to another TSI of set H via a delay line P the length of which, in terms of timeslots, is an odd number. Each switch of set L has one input directly connected to a TSI of set I and its other input is indirectly connected to another TSI of set I via a delay line Q the length of which is also an odd number.

Figure 4:
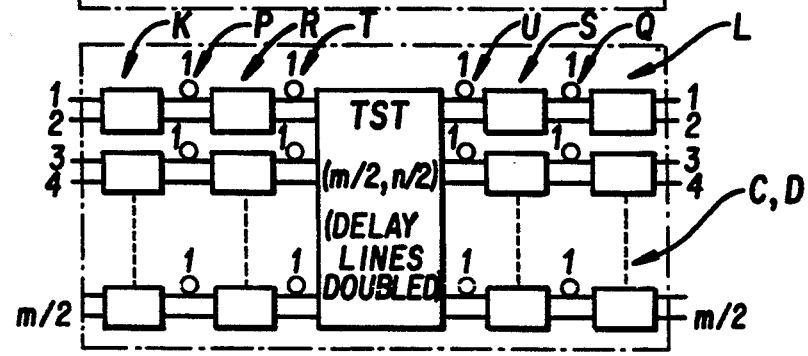
FIG. 4 illustrates an exemplary modification for the FIG. 3 embodiment.

In the modified arrangement of FIG. 3 there is no guarantee of frame integrity preservation and accordingly a further modification is provided as shown in FIG. 4 which achieves frame integrity. FIG. 4 is the same as FIG. 3 except for the introduction of a fifth set R of 2×2 cross-bar switches and a sixth set S of 2×2 cross-bar switches. Each switch of set R has one output directly connected to the input of a TSI in set H whereas its other output is indirectly connected to the input of another TSI in set H via a delay line T the length of which is an odd number. Each switch in set S has one input directly connected to the output of a TSI in set I and its other input is indirectly connected to the output of a TSI in set I via a delay line U the length of which is an odd number. The switches of sets R and S are controlled via controller G so that all switches of set R are simultaneously in the same state but that state alternates with each timeslot and is the crossed state on entry of the first block of a frame. The switches of set S are simultaneously all in the same state. The state in set R may be the same as or may be different from the state in set S.

The TST of FIG. 2 utilises discrete TSI and space switch net components and is one implementation of the TST required by FIG. 3. However, the functional equivalent is to recursively replace the TST of FIG. 3 by the entirety of FIG. 3 itself with a doubling of the delay line length in each recursion. This functional equivalent comprises a distributed collection of interconnected switches and delay lines in which the delay lines P and Q and their recursive versions function as the required TSIs H and I of FIG. 2 and the switch sets K and L and their recursive versions function as the required space switch net J of FIG. 2.

Likewise, the TST of FIG. 4 may be formulated either as the recursive version of the entirety of FIG. 3 and without using the discrete implementation of FIG. 2, or as the recursive version of the entirety of FIG. 4. Of course if the TST of FIG. 4 incorporates any part of FIG. 3 frame integrity cannot be guaranteed. When the TST of FIG. 4 is recursively formulated with the entirety of FIG. 4 each input and output terminal effectively forms a channel having only switches and delay lines of differing length according to the number of recursions. The order of the different delay lines along the channel is not significant and they may be reordered.

The network 10 of FIG. 1 may itself form the TST of FIG. 3 or the TST of FIG. 4 in each case with the length of the delay lines doubled. Furthermore the network 10 may recursively form nets C and D of FIG. 1.

It will be appreciated that in the network 10 in addition to the value of M being unlimited, the value of N (the number of timeslots per frame) is also unlimited.

Figure 5:
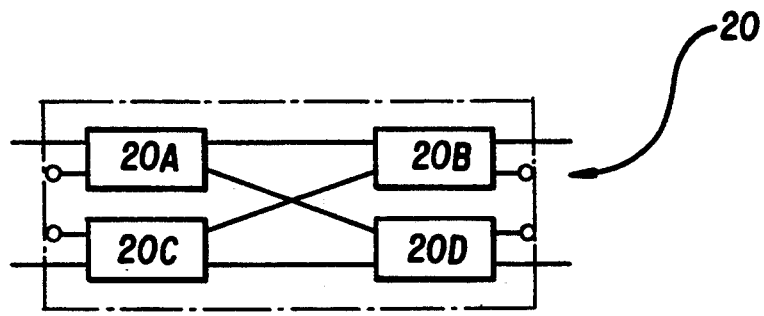
FIG. 5 illustrates an exemplary switching structure for each 2×2 switch used in the earlier-described exemplary embodiments.
Figure 6A:
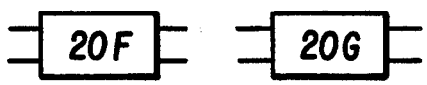
FIGS. 6A–6B illustrate still further exemplary switch arrangements for use in this invention.
Figure 6B:
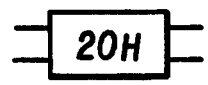
Figure 7A:
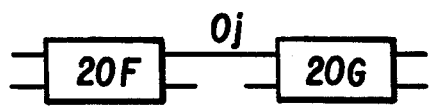
FIGS. 7A–7C illustrate yet further exemplary switch arrangements with delay lines for use in this invention.
Figure 7B:
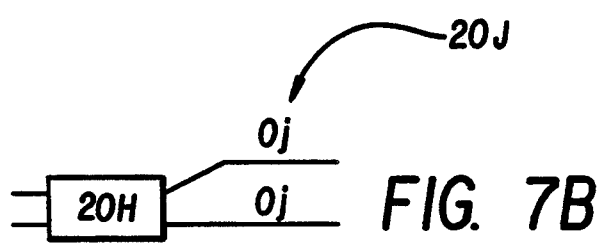
Figure 7C:
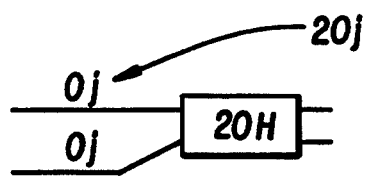

In the forms of the network 10 which have been described each switch simultaneously carries two signals which, depending upon the quality of the switch, may give rise to cross-talk degradation of the signals. This can be avoided if each switch previously described is replaced by the switching structure 20 shown in FIG. 5. Structure 20 comprises four 2×2 cross-bar switches 20A,20B,20C and 20D but only two inputs and two outputs are used. Each switch 20A etc only carries one signal. Use of the structure 20 may give rise to two adjacent switches 20F,20G which are interconnected by only one link, the other output of the first switch 20F and the other input of the second switch 20G being unused (as shown in FIG. 6A) in which case switches 20F and 20G can be replaced by a single switch 20H (as shown in FIG. 6B). In the event that switches 20F and 20G are interconnected with a delay line (as shown in FIG. 7A) they may be replaced by the single switch 20H and two associated delay lines 20J either in the form shown at FIG. 7B or in the form shown at FIG. 7C. The replacement of two or more switches of course requires a compensatory modification to the operation of the control algorithm initiated by controller G.

The networks previously described may give rise to sets of switches forming a sub-net with delay lines at either their input terminals or their output terminals, the sub-net being juxtaposed with another sub-net of similar configuration. In this case the sub-nets may be modified by moving the delay lines across the switches and combining the delay lines of the two sub-nets with a suitable compensatory alteration of the switch timing being effected by the controller G. The advantage of such an arrangement is that larger circuit boards can be utilised having nothing other than switches which results in fewer circuit boards and fewer board interconnections. This reduces signal attenuation.

Figure 8:
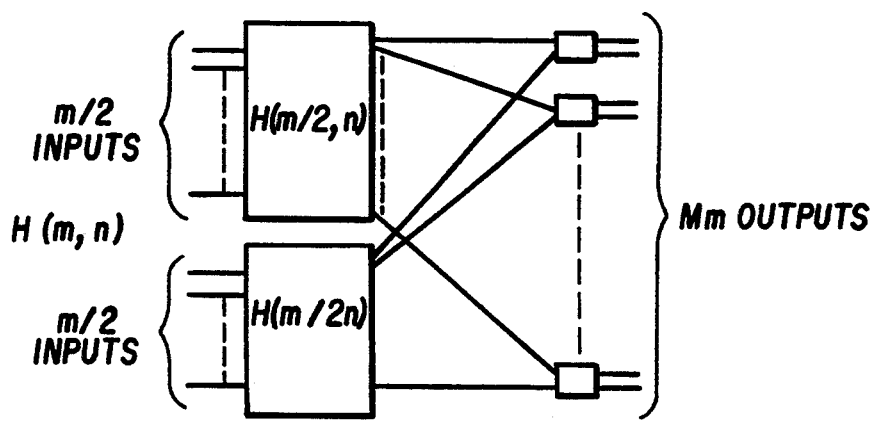
FIG. 8 illustrates an exemplary network containing two sub-nets.
Figure 9:
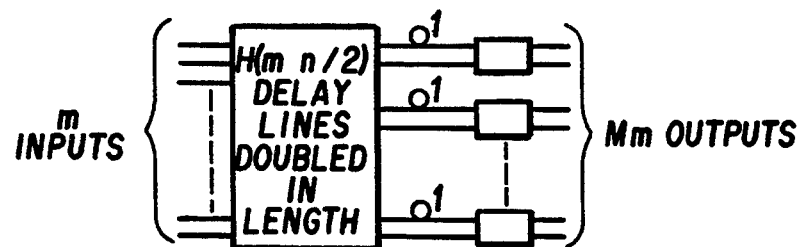
FIG. 9 illustrates an exemplary network handling twice as many timeslots per frame but without frame integrity.
Figure 10:
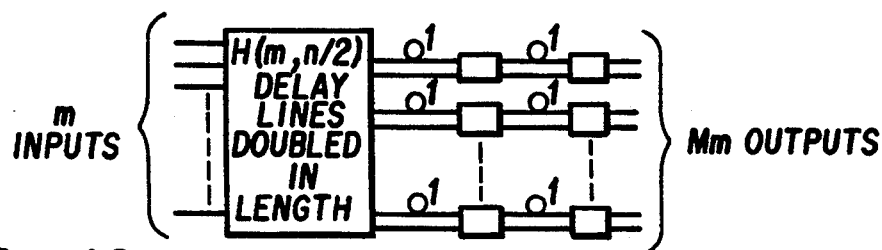
FIG. 10 illustrates a modified version of the embodiment in FIG. 9 but with frame integrity.
Figure 11:
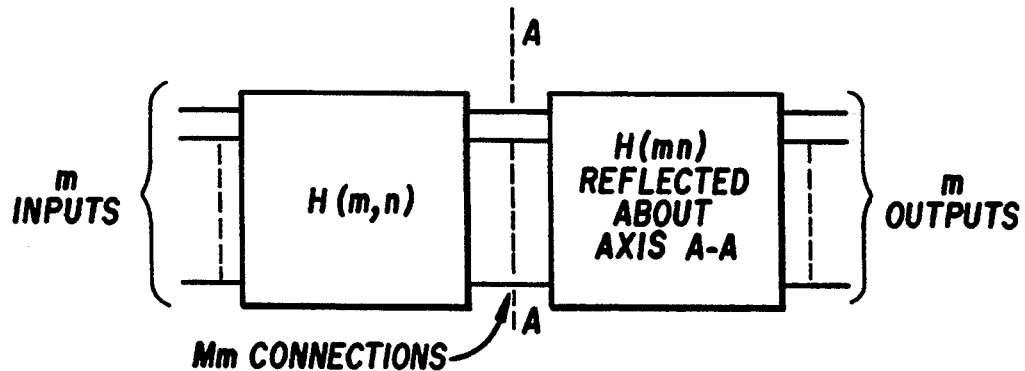
FIG. 11 illustrates a finished exemplary network connecting together one network with its mirror image.

Although the network designs previously discussed have provided for reduced numbers of switches from previously known communications switching networks with a comparatively small increase in switch numbers the controller G as previously described has a speed of operation which in certain circumstances may be considered too slow. It may therefore be preferred to use a modified controller which operates faster and which utilises the control algorithm for Cantor networks rather than Benes networks as described in the papers by Pippenger entitled "The complexity theory of Switching networks" (Technical Report 487, Research Laboratory of Electronics, MIT, 19th December, 1973) and by Hui entitled "Switching and Traffic Theory for Integrated Broadband Networks" (Kluwer Academic Publishers, 1990). To achieve this the number of switches required must be marginally increased from that previously discussed. It is preferred to do this in a structural manner by defining a network H (m,n) and then defining the required network in terms of H(m,n) where m is the number of inputs/outputs in the finished network and n is the number of timeslots per frame. Thus H(1,1) is a simple 1×M demultiplexer where M is greater than or equal to $\log_2 m, n$. FIG. 8 then illustrates a network H(m,n) containing two sub-nets H(m/2,n) each with Mm/2 outputs whilst FIG. 9 illustrates a network handling twice as many timeslots per frame but without frame integrity. FIG. 10 is a modified version of FIG. 9 which provides frame integrity. The finished network is then formed by connecting together the H(m,n) network and its mirror image as illustrated in FIG. 11. The demultiplexer of the H(m,n) network is then a multiplexer in the mirror image. Finally, the output stage switches of the H(m,n) network, being directly connected to the input stage switches of the mirror image network, are unified or merged and implemented as a single interstage switch.

Particular examples of such finished networks are illustrated in FIGS. 12 to 15.

I claim:

1. A communications switching network comprising:
    M number of input terminals for receiving M number of multi-block communications signals in parallel, M being any predetermined integer,
    M number of output terminals for delivering M number of signals in parallel,
    first and second time-space-time (TST) switching networks each having M/2 input terminals and M/2 output terminals,
    a first set of M/2 number of 2×2 switches connected between the input terminals of the TST switching networks and the M input terminals with each switch in said first set having a first output connected to the first TST switching network and a second output connected to the second TST switching network,
    a second set of M/2 number of 2×2 switches connected between the output terminals of the TST switching networks and the M output terminals with each switch in said second set having a first input connected to the first TST switching network and a second input connected to the second TST switching network.

2. A communications switching network as in claim 1, wherein each TST switching network comprises first and second sets of M/2 time-slot-interchangers (TSI) interconnected by a reconfigurable space switch network having M/2 inputs and M/2 outputs.

3. A communications switching network as in claim 1, wherein each TST switching network comprises a functional equivalent of a reconfigurable space switch network with first and second sets of time slot interchangers, the equivalent comprising a distributed collection of interconnected switches and delay lines.

4. A communications switching network as in claim 2, wherein each TSI is an N timeslot interchanger, where N is the number of timeslots per frame in each of the signals delivered to the M input terminals of the communications switching network.

5. A communications switching network as in claim 2, wherein each TSI is an N/2 timeslot interchanger.

6. A communications switching network as in claim 5, wherein each TST switching network further comprises:
    a third set of M/2 number of 2×2 switches connected between the first set of timeslot interchangers and the first set of switches with each switch in said third set having one of its outputs directly connected to a predetermined TSI of the first set of timeslot interchangers and the other of its outputs connected to a different TSI of the first set of timeslot interchangers via a delay line, and
    a fourth set of M/2 number of 2×2 switches connected between the second set of timeslot interchangers and the second set of switches with each switch in said fourth set having one of its inputs directly connected to a predetermined TSI of the second set of timeslot interchangers and the other of its inputs indirectly connected to a different TSI of the second set of timeslot interchangers via a delay line.

7. A communications switching network as in claim 6, wherein to preserve frame integrity of the multiblock communications switching signals at the M output terminals of the communications switching network, each TST switching network further comprises:

a fifth set of M/2 number of 2×2 switches connected between the first set of timeslot interchangers and the third set of switches with each switch in said fifth set having one of its outputs directly connected to a predetermined TSI of the first set of timeslot interchangers and the other of its outputs connected to a different TSI of the first set of timeslot interchangers via a delay line, and a sixth set of M/2 number of 2×2 switches connected between the second set of timeslot interchangers and the fourth set of switches with each switch in said sixth set having one of its inputs directly connected to a predetermined TSI of the second set of timeslot interchangers and the other of its inputs indirectly connected to a different TSI of the second set of timeslot interchangers via a delay line.

8. A communications switching network as in claim 1 and which is adapted to handle optical communications signals with said switches in the form of optical directional coupler switches or their functional equivalent.

* * * * *